United States Patent [19]

Parks

[11] Patent Number: 5,781,687
[45] Date of Patent: Jul. 14, 1998

[54] SCRIPT-BASED, REAL-TIME, VIDEO EDITOR

[75] Inventor: Micheal Jay Parks, Tucson, Ariz.

[73] Assignee: Studio NEMO, Inc., Kirkland, Wash.

[21] Appl. No.: 67,992

[22] Filed: May 27, 1993

[51] Int. Cl.$^6$ .................................................. H04N 5/93
[52] U.S. Cl. ........................................... 386/52; 386/62
[58] Field of Search .......................... 360/14.1–14.3, 360/23.1, 13; 358/311, 335; 386/52, 4, 55, 57, 60, 62, 64; 345/327, 328; 369/83

[56] References Cited

U.S. PATENT DOCUMENTS

| | | | |
|---|---|---|---|
| 3,740,723 | 6/1973 | Beausoleil et al. | 340/172.5 |
| 4,329,719 | 5/1982 | Ninomiya | 360/14 |
| 4,394,694 | 7/1983 | Ninomiya | 360/14.3 |
| 4,507,691 | 3/1985 | Ishiguro et al. | 360/14.3 |
| 4,847,690 | 7/1989 | Perkins | 358/143 |
| 4,858,033 | 8/1989 | Chippendale | 360/14.2 |
| 4,863,384 | 9/1989 | Slade | 434/107 |
| 5,097,349 | 5/1992 | Nomura et al. | 358/335 |
| 5,172,281 | 12/1992 | Ardis et al. | 360/33.1 X |
| 5,181,823 | 1/1993 | Hussey et al. | 414/730 |

*Primary Examiner*—Andrew L. Sniezek
*Attorney, Agent, or Firm*—Cahill, Sutton, & Thomas, P.L.C.

[57] ABSTRACT

A personal computer having a timing decoder and a graphics overlay card is programmed to interpret a script written in accordance with a predetermined grammar or format. A pair of tape decks, one for playback and one for record, are connected to the graphics overlay card. The script is stored in the computer and read or interpreted by the computer, which generates control signals to operate the graphics overlay card. The tape decks are run without pausing and the editing operation takes only as long as a normal copy. There is no operator intervention.

12 Claims, 2 Drawing Sheets

SCRIPT-BASED, REAL-TIME, VIDEO EDITOR

COPYRIGHT AUTHORIZATION

A portion of this patent document contains unpublished material which is subject to copyright. The copyright owner has no objection to the facsimile reproduction by anyone of the patent document or the patent disclosure, as it appears in the Patent and Trademark Office patent file or records, but otherwise reserves all rights to copy or reproduce the copyrighted material in any form.

BACKGROUND OF THE INVENTION

This invention relates to video signal processing and, in particular, to a method for editing a video signal in real time by means of a computer following a script.

In conventional practice, several steps are necessary in order to produce inexpensive but high-quality subtitles for foreign films on video tape. First, a copy of the film is transferred to professional video tape, producing a master or source tape of the film, typically including time codes stored between frames or on a separate track. Next, a "window burn" is made, i.e. the master is copied onto consumer-grade tape such as VHS tape, to which is added an on-screen display of the time codes. The dialog of the film is translated and combined with the timing information from the VHS tape to produce a script in the second language. In the script, each piece of text includes two times, "on" and "off", based upon the displayed time codes.

The completed script and the master are sent to a video studio. A video studio typically has at least the following equipment: two professional video tape decks (one player and one recorder), signal conditioning equipment (e.g. a time-base corrector), a character generator (such as a "Chryon"), an edit controller, and a switching circuit for controlling the flow of video signals among the other equipment.

One additional piece of equipment is also necessary, the destination tape, i.e. the tape for receiving the edited video signal. In order to move the source and destination tapes in synchronism, the destination tape must include time codes. Since a blank tape has no time codes, the blank tape must be "pre-blacked," i.e. black frames, and the corresponding time codes, are recorded the entire length of the tape. Pre-blacked tapes are significantly more expensive than blank tapes.

To produce a subtitled version of a film, the person editing the tape first copies a section from the source tape onto the destination tape. The decks are paused at the first "on" time and the editor manually types text into a character generator or similar device. The text is overlaid on the original video and the decks are re-started and permitted to run until the "off" time is reached, when the decks are paused again. The editor either types in new text or clears the character generator and passes the next segment through unmodified. For each hour of film, there can be anywhere from two hundred to nine hundred passages of text and hundreds or even thousands of edit operations. Each hour film can take between four and twenty hours to subtitle, depending on the complexity of the film and the experience of the editor.

After the subtitled version is finished, it is difficult to modify. If one word is misspelled, an "insert edit" can be performed, duplicating the original editing operations and replacing the appropriate portion of video. Larger changes are proportionally more difficult. A blanket change in the color of the text, or alterations in the font size or font style require the entire editing process to be redone from scratch, requiring another four to twenty hours of work.

There are variations of the procedure outlined above. For example, the translation can be produced without timing information, relying on the editor to provide the subtitles at the appropriate times. One technique for doing this stores the text in multiple pages of a character generator. A normal copy is begun and the editor scrutinizes the film. At appropriate moments, the editor presses a key or foot pedal, signaling the character generator to swap in the next page of dialog. Although this is less expensive than line-by-line editing, the timing is often of poor quality. As before, a modification requires either an insert edit or a complete re-cut and a blanket change requires a complete re-cut.

With all of these techniques, the large number of edits needed for the subtitled version creates problems for older editing equipment. A pause in the copying process may introduce an error in the synchronization signals and may allow equipment settings to drift. Although many techniques exist to prevent this (as disclosed in U.S. Pat. Nos. 4,329,719, 4,394,694, and 4,507,691, for example), a brief loss of synchronization, video "glitches", and abrupt changes in color, brightness or video quality can occur.

While the techniques described permit one to add subtitles, the complexities of editing make it extremely difficult to edit single frames of a film, e.g. to add moving graphic or animation to a scene. Each frame may take minutes or hours to compose and coordinating the added graphic with the existing footage is both difficult and error prone.

In view of the foregoing, it is therefore an object of the invention to provide apparatus for editing video recordings in real time with precise control of timing.

Another object of the invention is to provide inexpensive apparatus for editing single frames of video.

A further object of the invention is to provide an editing system in which a computer controls video processing equipment in accordance with a script.

Another object of the invention is to provide a system for adding subtitles to films more quickly, less expensively, and with higher quality than has been available in the prior art.

A further object of the invention is to provide an editing system which can use blank destination tape.

SUMMARY OF THE INVENTION

The foregoing objects are achieved by the invention in which a personal computer having a video time decoder and a graphics overlay card is programmed to interpret a script written in accordance with a predetermined grammar or format. A pair of tape decks, one for playback and one for record, are connected to the graphics card. The script is stored in the computer and read or interpreted by the computer, which generates control signals to operate the graphics card.

A timed script is produced as in the prior art, except that the script must follow a strict format, making the script machine readable. The script is a text document which can be produced and modified by any commercially available word processor. Because the script follows a prescribed format, the script is also a high level program which can be read and understood by a computer.

Within the computer, a time decoder reads the time codes produced by the playback deck from the tape. The graphics card includes its own memory which can be divided into two or more image buffers under software control. In a preferred embodiment of the invention two image buffers are used. One image buffer is selected and the image in the selected buffer is combined with or overlaid on the incoming video signal. The modified signal is then sent to the record deck. Initially, a completely transparent image is stored in one of the image buffers and that buffer is selected for the beginning of the editing process.

The software reads the script for the first subtitle or overlay. Associated "on" and "off" times are also read from the script and are stored in a buffer in the main memory of the computer for comparison with the time codes in the script. The text of the first subtitle is stored in the second (unselected) image buffer and the software waits until the time code from the time decoder matches the stored "on" time. When the "on" time arrives, the second image buffer is selected, combining the subtitle with the incoming video to produce a modified video which is passed to the recording deck. The first (unselected) image buffer is cleared and the second subtitle, or a blank screen, is stored in preparation for the next "on" and "off" instructions. The process continues until the editing is completed.

The editing takes place in real time; that is, the playback deck plays without pausing and the recording deck records without pausing. There is no back-and-forth editing, no required pre-roll, and no pre-blacking. The editing is done at maximum speed, requiring minimum studio time. Swapping image buffers does not alter the synchronization information, nor does it alter the signal quality, color values, or brightness levels. There is also significantly less stress on the tapes and less wear on both the tapes and the recorders. Consumer grade tape decks can be used instead of professional decks. Since no advanced start-and-stop operation is required, a consumer grade tape deck is a perfectly adequate signal source, as long as the deck can produce a time code signal (e.g. from on one of the two stereo tracks on a hi-fi stereo deck). Low-quality "check tapes" can be produced outside of a studio at nominal cost and used for style tests, proof-of-concept, client approval, pre-release promotion, or dozens of other uses. Unlike conventional techniques, major changes can be made with a simple (one line) change to the script. Letter color and size can be changed, a new font design can be selected, and text positions can be adjusted. A complete re-cut is done at the speed and cost of a simple copy.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
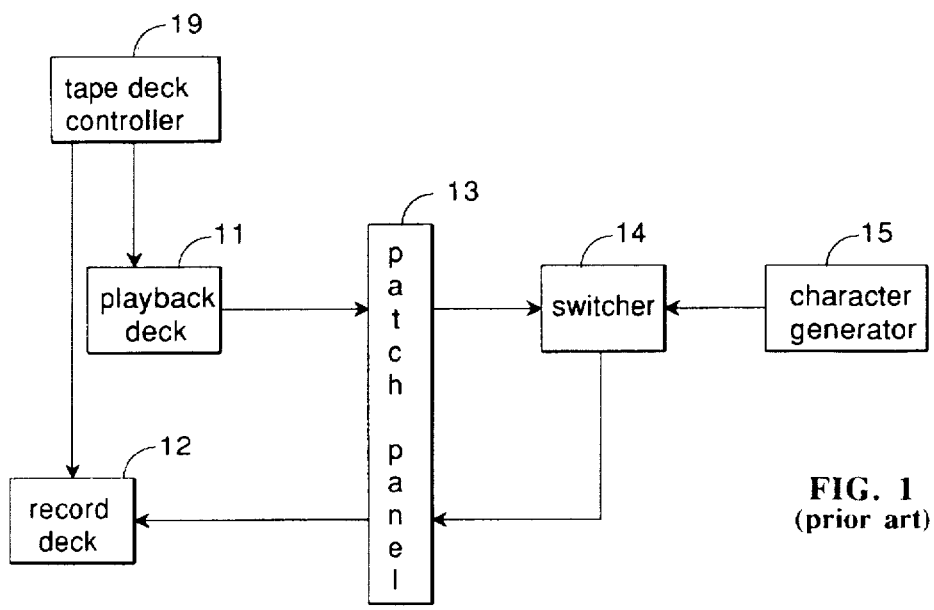
FIG. 1 is a block diagram of a conventional editing system.

FIG. 1 is a block diagram of an editing system of the prior art. A master tape is placed in playback deck 11 and the destination or dubbed tape is placed in recording deck 12. The video output from deck 11 is connected to an input of patch panel 13. Patch panel 13 is found in a typical video studio and is simply a panel with a large number of connectors to facilitate wiring together different pieces of equipment. Panel 13 can be omitted. The output from panel 13 is connected to switcher 14, where the video signal is merged with the output from character generator 15. The output from switcher 14 is connected through panel 13 to the video input of recording deck 12. Controller 19 is connected to the control ports of decks 11 and 12 for simultaneous operation of the two decks.

In order to record one section of unaltered video followed by one section of subtitled video, the editor causes controller 19 to pause the tapes while the output from character generator 15 is cleared. The tapes are run a predetermined length of time, as set by the time codes in the script, and the tapes are paused again while the subtitle text is entered into character generator 15. The tapes are run until the end of the period determined by the time code and then paused again. The process is tedious and prone to errors.

Figure 2:
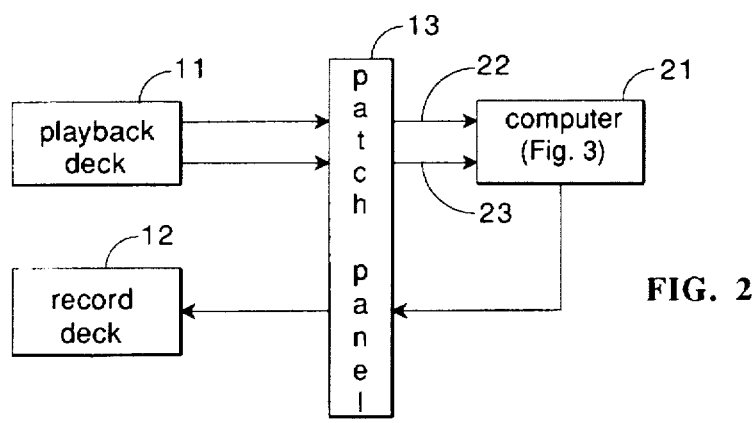
FIG. 2 is a block diagram of an editing system constructed in accordance with the invention.

FIG. 2 illustrates an editing system constructed in accordance with the invention. Decks 11 and 12 are connected through panel 13 to graphics card in computer 21. Deck 11 is also connected to a time decoder in computer 21. A controller is unnecessary since the editing takes place in real time, i.e. the decks are not paused during editing.

Computer 21 receives two inputs from patch panel 13, a video signal on line 22 and an SMPTE (Society of Motion Picture and Television Engineers) time code on line 23. The SMPTE time code is usually recorded in both the video and audio portions of a video tape. Professional tape decks include three or more sound tracks, including stereo left, stereo right, and an auxiliary track. Time codes stored in the auxiliary sound track are known as longitudinal time codes and time codes stored between frames in the video signal are known as VITC (Vertical Interval Time Code). The longitudinal time codes are more easily retrieved than VITC but are not available if the tape is paused. Most editing equipment relies on VITC since it is available even when a tape is paused. If VITC codes are used, only the video signal is sent to computer 21 and audio line 23 can be omitted. Although not shown in FIG. 2, the soundtrack from the tape is played on deck 11 and recorded by deck 12.

Figure 3:
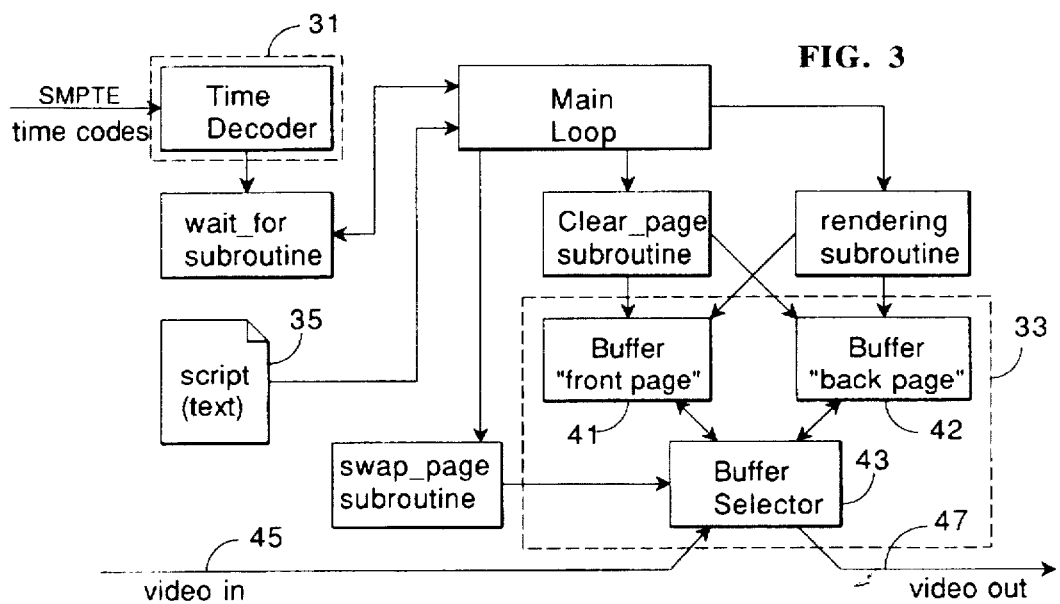
FIG. 3 is a block diagram showing the hardware and software components of a computer used in an editing system constructed in accordance with the invention.

FIG. 3 illustrates the hardware and software portions of computer 21 used in the editing process. In one embodiment of the invention, computer 21 is a "386-based" personal computer, i.e. a computer having an Intel 80386 microprocessor. In addition to the typical configuration of such computers, computer 21 includes cards 31 and 33. Card 31 decodes the longitudinal time code and formats it for the computer. Card 33 is a graphics card.

There are computer cards commercially available for performing both time code input and graphics overlay on NTSC (National Television Standards Committee) video. In a preferred embodiment of the invention, a MusicQuest "MQX-16S" sound card was used for card 31 and a True-Vision "Targa+ 64" NTSC video card was used for card 33. These cards are readily available and C-language option libraries are also available for operating both cards. Both cards are capable of a large number of functions which are not used in the invention. The MQX-16S is primarily a MIDI-control card and the time code reader is usually considered a minor feature. The Targa+ 64 is capable of operating in dozens of other modes, e.g. performing real-time color re-mapping through the use of hardware look-up tables.

Card 33 includes first image buffer 41, second image buffer 42, and buffer selector 43. Image buffers 41 and 42 store one screen's worth of data which can be overlaid on the video signal on input line 45 to selector 43. Video output line 47 can be connected to a recorder and/or to a video display. Either image buffer can be selected, i.e. placed "on-line." The on-line buffer is referred to as the "front page" and the off-line buffer is referred to as the "back page." Either image buffer can be the front page or the back page. Since changing the contents of the front page will produce distortions in a displayed image, all changes are made to the back page.

A page is cleared, i.e. made transparent, by storing a particular value in all memory locations, e.g. 00 (zero). This function is performed by the "clear_page" subroutine. A transparent page permits the input signal to pass through selector 43 unmodified. Other values indicate an opaque pixel.

The text for the subtitles is stored at an assigned location (buffer) in the main memory of the computer and is transferred one character at a time to the back page by the "rendering" module. Each character is stored in the back page as an array of pixels, i.e. a graphic. Pages are swapped between frames under the control of the "swap_page" subroutine.

It is assumed that the software begins execution before the decks are started, or during a pre-roll before recording begins. At initialization, the front page is cleared. The first "on", "off" and "next off" times are stored in three buffers in main memory. The times are initially all set to zero and the rendering buffer (the back page) is set to "transparent" by the initializing routine. Once the tape begins rolling, a time code is read from the tape. This time code has a value greater than zero, typically about fifty-seven minutes. Most professional tapes begin the regular program at the one hour mark, reserving the time before one hour for color bars, slate, and other studio requirements.

Figures 4, 5:
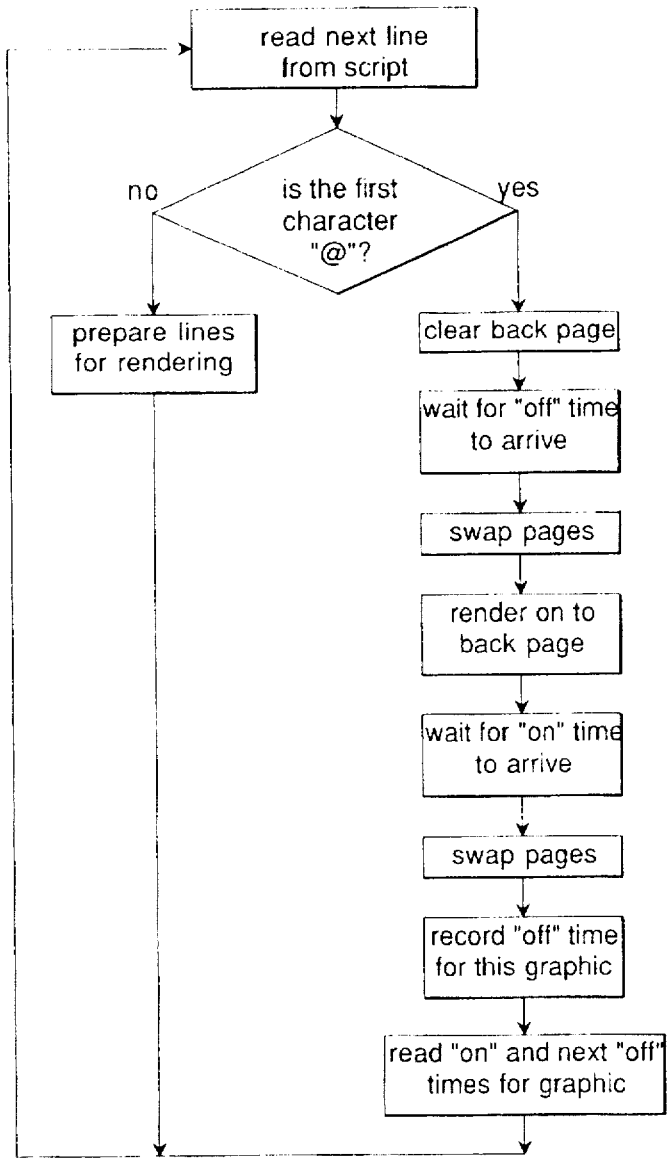
FIG. 4 is a flowchart of the main loop in the software.
FIG. 5 is a sample script including a list of edit events written in a format readable by the software.

As the tape plays in deck 11, computer 21 monitors the time code signals and responds in real-time. The video signal from line 45 is constantly combined with the contents of either image buffer 41 or image buffer 42. Depending on the data in the front page, the video signal can pass through unaltered, be completely overwritten, or, as in the case of subtitles, be partially overwritten. Simultaneously, the main program loop reads the script, monitors the time code and renders new images onto the back page. FIG. 4 is a flow chart of the main program loop.

The main program loop is best understood by also considering the script shown in FIG. 5. FIG. 5 is a sample script listing a series of edit events as a series of lines in which the first line of each event is a timing code preceded by an "@" symbol. All lines beginning with an "@" are time codes, listing the "on" time first, a comma, and the "off" time. The time codes are listed as hour:minute:second:frame, a notation common in video. In the first edit event, the second and third lines (a title) come on at one hour even and go off at one hour and five seconds. Lines not beginning with an "@" or other key symbol are considered text. All lines end with a carriage return symbol.

In the prescribed format, there are one or more lines of rendering instructions following the time codes. In the edit events shown in FIG. 5, the rendering instructions are simply one or more lines of text, which appear on the screen verbatim. The particular format is a matter of choice, what matters is that there is a prescribed consistency which enables the computer to interpret the script.

The main program loop reads the first line of the script, "@1:00:00:00,1:00:05:00". This line is a time code beginning with "@", so program control passes to the right side of the flowchart in FIG. 4. The back page is cleared (set to transparent) and, since the "off" time has already arrived, the pages are immediately swapped (this has no visible effect on the output video). Rendering is now done on a new back page. Since the back page was initialized to "transparent", no action is taken and the back page remains clear. Since the "on" time (set to zero during initialization) has already arrived, the pages are immediately swapped, again with no effect. The "next off" time, also set to zero during initialization, is stored in the "off" variable. Control has passed to the bottom box on the flowchart, initialization has finished and the first line can now be processed. The right side of the main loop takes less than a second on a moderately powerful personal computer (such as a 386-based machine).

In the bottom box on the flowchart (read "on" and next "off" time for graphic), the input time codes are finally processed. The string, "@1:00:00:00,1:00:05:00" is parsed and the value for "one hour even" is stored in the "on" time variable. The value for "one hour, five seconds" is stored in the "next off" variable. All time values are actually stored as seconds in floating-point format. This allows the system to convert easily between different frame formats, such as 30-frame drop, 30-frame non-drop, 25-frame and 24-frame, all of which are used in the entertainment and broadcast industries.

Control returns to the top of the flowchart and the next line is read from the script. "THE HONEYMOONERS". Since this line is not a time code (no "@"), it is prepared for rendering by being placed into a temporary buffer (not image buffers 41 or 42). Reading the text in a short loop and storing the text in a temporary buffer make the rendering job more efficient. Control returns to the top of the loop and the line "AT HOME" is read. Again, this line is not a time code, so it is added to the temporary buffer. Finally, when control returns to the top, another time code line is read, "@1:00:15:13,1:00:14:22".

Since this line contains an "@" symbol, control passes to the right side of the flowchart. The back page is cleared and the "off" time (last set to zero) has passed, so the pages are immediately swapped. Finally, the rendering module comes into effect. It must render the two lines "THE HONEYMOONERS" and "AT HOME" onto the back page. This will leave the majority of the page transparent, but will place rendered images of the letters onto the bottom portion of the page. The design of the graphics card is such that the page is loaded from the bottom up.

Once the rendering is completed, the system enters a tight loop, waiting for the "on" time to arrive (one hour even). The waiting subroutine will actually return part way through the video field immediately preceding that time and control passes to the "swap_pages" subroutine. This subroutine includes the subroutine "VWait" which causes the computer to wait for a vertical retrace before swapping image buffers, ensuring that there is a clean transition without signal jumps. "VWait" is a subroutine from a library supplied with the graphics card.

The next video field, which is the first to display the overlay text, has the time code of one hour exactly. The "next off" variable, which holds the value "one hour, five seconds" is moved to the "off" variable and the system now has five seconds of free time. During this time, the system reads and processes the data for the next edit event. The cycle continues indefinitely, until an end-of-file is reached in the script. At that point, the program ends, leaving a clear image buffer on-line. Alternatively, one can pad the script with blank lines at very distant time values and any shutdown glitches will occur long past the end of the tape.

A feature of the invention is the machine-readable script. The script can be edited with commonly available word processors, enabling one to check spelling and grammar. Since an edited script is not retyped, one avoids transcription errors and reduces labor costs. Special analysis tools can also be used. For example, in the particular application of subtitling, since the script must specify the exact wording and timing, analysis tools can model the script against predicted audience reading speeds and recommend changes if necessary. The result is subtitling which is far more enjoyable and easier to read than conventionally produced subtitles.

For professional writers, a standard "word" is six characters long, including spaces and punctuation. Using this definition, "words-per-minute" is equal to "characters-per-second" times ten. Reading times for a text are estimated by simply counting characters and dividing by a constant. Based upon empirical data, a reading speed of sixteen characters per second plus a "lag time" (the time to realize that the text has changed) of one half second have been found suitable. If the available reading time, the difference between the "on" time and the "off" time, is less than the estimated reading time (number of characters divided by sixteen) plus the lag time, an error is indicated, e.g. the particular text is marked for review by adding a flag character to the edit event. The text is also checked for format errors and inverted time codes (the "off" time coming before the "on" time).

The main program loop is specifically optimized for the production of subtitles on a double-buffered system. Significant computer time is spent in processing the script and in rendering images onto the back page. The tasks in the main loop are arranged to take advantage of the time available, e.g. the time it takes to read a subtitle, to provide the maximum amount of time for performing each task. This is why the tasks in the right hand side of the loop seem to begin in the middle, i.e. the "on" and "off" times for the next event are processed at the end of the loop, not at the beginning. Since the loop is arranged this way, default data (zero time codes) are supplied by the initializing routine for the first pass through the loop.

The only constraints on subtitle timing are the minimum time that the title must remain on-screen to be read by a human viewer and the presence of two image buffers rather than three. Reading time for a subtitle is at least a few tenths of a second and more typically a few seconds, a great deal of time for a computer. During this time, the computer must perform as much processing as possible. Thus, as soon as a new page has been displayed, the next script lines are read and stored in a temporary buffer.

With two image buffers rather than three, the back page must be transparent when the pages are swapped and rendering must wait until the transparent page is swapped in and the former front page is cleared and ready for data. Since a blank page is inserted between each display of text, image buffer 42 only needs to be cleared once and rendering will always be performed in image buffer 41. In theory, the "clear back page" subroutine can be executed as part of the system initialization and not as part of the main loop, thereby saving time in the main loop. The "clear back page" subroutine in the main loop becomes useful when advanced features, such as superimposition or immediately switching to new images, are used, or when more than two image buffers are used. If a system were to be used only for simple subtitling, the "clear back page" function could be moved out of the main loop.

As described so far, the system is capable of performing fairly simple subtitling. Although this example does not use them, additional functions are available on the graphics card, such as fade-on, fade-off, scrolling, and panning. These functions are accessed through a code letter following the "@" symbol. For example, "@" tells the card to scroll the text/image. The parsing routine checks for a letter or a number following the key symbol and modifies the operation of the card accordingly.

Thus, a system constructed in accordance with the invention has a number of hardware and software options which can be used in a large number of combinations, depending on the particular task or customer need. Implementing a particular combination of options is within the capability of those of skill in the art, who would be aware, for example, that some of these options may affect (lengthen) the rendering process, such as font type, size, style, outline, drop shadow, color and height of the line. More powerful, time sensitive options include the ability to load small or full-screen graphic elements from disk or memory and to control them in the same way that text is controlled, e.g. fading images.

Some other capabilities of the graphics card are "chroma keying," "color keying," and "alpha channel." Chroma keying (blue screen) is used less of late, color keying being preferred. In color keying, the card is programmed to render a certain color as transparent. Alpha channel refers to the high order bit(s) for a character. As indicated in the Appendix, the card is operated in the 16-bit mode. Of these bits, the highest order bit is used to indicate transparency. The other bits are treated in three groups of five for specifying a red, green, and blue intensities for this pixel. In 32-bit mode, the highest eight bits are the alpha channel and indicate degrees of transparency.

While described in terms of a subtitling station, the apparatus and software described can be used for many other applications provided that video length is not altered, only overlay or replacement edits are performed, the new edit can be specified in a computer-readable form, the new edit can be loaded or rendered into an image buffer, and the loading or rendering operation can be performed in the time available.

With additional image buffers, and more complex software, a system constructed in accordance with the invention can produce a small animation element over existing video, such as an animated character in a live-action scene. This requires that the rendering system draw the animated character in no more than 83 milliseconds.

The system can be used, as part of a complete animation system, to add a "layer" of animation (a software analog to the acetate cell in a conventional animation stand). A complex show is laid down one layer at a time, with each layering pass lasting several minutes. This is in contrast to conventional animation which produces a finished image by putting all layers together at once, for a segment that is a fraction of a second long.

The Appendix is a C-language source code listing for a subtitling system capable of interpreting the script shown in FIG. 5. The Appendix refers to but does not include the libraries that come with or are available for the time decoder card and the graphics card. The Appendix refers to but does not include the binary tables for converting a character into an array of pixels. These tables are not human readable and the generation of such tables is well known in itself.

PATENT
4946-A-1

SOURCE CODE LISTING

```c
/******************************************************************
                    © M. Jay Parks unpublished
 ******************************************************************/
#include <string.h>
#include <stdlib.h>
#include <stdio.h>
#include "mcc.h"                    /* MCC/MQX-32 C library functions   */
include <targraf.h>                /* includes targrapl.h              */ typedef unsigned int u_int;         /* more convenient                  */
typedef unsigned char byte;

typedef struct {
    int   height;            /* height of each character                */
    int   bottom_edge;       /* dist to move down after each line  (may be neg) */
    int   right_edge;        /* dist to move rt. after each lettr  (may be neg) */
    byte far *color;         /* [??]  list of color values              */
    byte far *first_line;    /* [128] first Y line with data, this char */
    byte far *last_line;     /* [128] last  Y line with data, this char */
    unsigned short far *start_datum;/* [128][ht] First non-backgrnd pixel, this X
line */
    byte far *end_datum;     /* [128][ht] Last  non-backgrnd pixel, this X line */
    byte far *left_edge;     /* [128][ht] No. of backgrnd pix before start_datum */
    byte far *char_width;    /* [128]     width of each character       */
} font_struct;

/********************** OPERATIONAL PARAMETERS ****************************/
#define MCC_ADDR      0x330         /* I/O address of the MQX SMPTE card */
#define MCC_IRQ       5             /* interrupt line     "       "   "  */
#define BOTTOM_EDGE   35            /* Bottom edge of text               */
#define PIXEL_DEPTH   2             /* we're in 16-bit mode (2 bytes)    */
#define BUF_Y_SIZE    21            /* 756 wide * 21  is just under 32k  */

/********************** MACROS & FUNCTION PROTOTYPES **********************/
int  COPROC_SLIH( void );           /* MQX function library.             */
void MCC_CLOSE( void );
int  MCC_COMMAND( int cmd );
int  MCC_OPEN(int ioaddr,int irqlevel);
void MCC_RESET( void );
void SET_SLIH( void (*slihaddr)() );
int  SMPTE_EFW( char smpte_fid[] );
int  STRK_END_EFW( void );
void graphics_off( void );          /* These functions are defined below, */
void close_mqx( void );             /* but they're used before that.      */

/************************ CONSTANTS ***************************************/
#define TRUE          1
#define FALSE         0
#define ESCAPE        '\033'
#define MAX_OUT_BUF   22            /* Number of subtitles we can prepare */

/********************** EXTERNAL VARIABLES ********************************/
extern font_struct nemo_pat;        /* Holds the font rendering info     */
```

Appendix - page 1

PATENT
4946-A-1

```
/*************************** GLOBAL VARIABLES ********************************/
u_int   *buff_addr        = NULL;              /* holds one line of drawn text    */
u_int   buffer_ct         = 0;                 /* height * width * PIXEL_DEPTH    */ char    stitle_buffer[MAX_OUT_BUF][80];        /* holds line segments to be written */
int     stitle_num_lines  = 0;                 /* number of lines in stitle_buffer */

FILE    *in_file          = NULL;              /* ptr to the input script file    */ double  start_time        = 0.0;               /* in seconds, time to draw  text  */
double  end_time          = 0.0;               /* in seconds, time to erase text  */
double  smpte_seconds     = -100.0;            /* last time read from SMPTE track */ int     color_list[6];                         /* color values for the letters    */
int     x_pixels, y_pixels;                    /* width & height of graphic device */
int     x_max;                                 /* x_pixels -1                     */
int     buffer_wd         = 0;                 /* width of the buffer/screen      */
int     buffer_ht         = 0;                 /* height, equal to font height    */
int     clear_color       = 0x8000;            /* aRGB parameters for screen backgrnd*/
int     front_page        = 0;                 /* targa page (0, 1) being DISPLAYED */

TplusRegs regs;                                /* Targa+ registers & driver variables*/

/*************************** UTILITIES ***************************************/
void clean_exit( int exit_code )
{
  if( in_file!=NULL ) {
    fclose( in_file );
  }
  graphics_off();
  close_mqx();
  exit( exit_code );
}

/******************** MQX SMPTE-CARD INTERFACE ******************************/
void open_mqx( void )                          /* Opens the device, initializes the */
{                                              /*   card, puts it in SMPTE mode.    */
  if( !MCC_OPEN(MCC_ADDR,MCC_IRQ) ) {          /* open MCC for use                  */
    printf( "ERROR: can't open MCC\n" );
    return;
  }
  SET_SLIH(COPROC_SLIH);                       /* Process interrupts from MQX card  */
  MCC_COMMAND(ENABLE_SMPTE_MSG);
  MCC_COMMAND(DISABLE_ALL_THRU);
  MCC_COMMAND(DISABLE_THRU);
  MCC_COMMAND(SMPTE_MODE);
  MCC_COMMAND(START_SMPTE_READ);
} void close_mqx( void )
{
  MCC_RESET();                                 /* return MQX to power-on state     */
  MCC_CLOSE();                                 /* close MCC, remove interrupt routine*/
}
```

Appendix - page 2

PATENT
4946-A 1

```c
double cur_time( void )                 /* returns current time in seconds,   */
;                                       /* or -100.0 (no time track)          */
byte    smpte_fld[4];                   /* Fld 1 also holds drop/non drop flag*/
double seconds;

if( SMPTE_EFW(smpte_fld) ) {          /* 1= successful read of a new frame  */
    seconds =   ((double)(smpte_fld[0] & 0x1f) * 3600.0)  /* hour field       */
              + ((double) smpte_fld[1] * 60.0 )           /* minutes          */
              + ((double) smpte_fld[2]        )           /* seconds          */
              + ((double) smpte_fld[3] / 30.0 )           /* frames           */
              + 1.0/30.0 ;
  }
  else {                                /* Couldn't get a new SMPTE frame,    */
    seconds = smpte_seconds;            /*   so use the last recorded time.   */
  }
  smpte_seconds = seconds;              /* Remember the current time.         */
  return( seconds );
} void wait_until( double time_setting )  /* Loops until we reach time_setting  */
{
  do {
  } while( cur_time() < time_setting );
}

/********************** GRAPHICS INTERFACE ********************************/
void clear_back_page( void )
{
  FillBlock( 0, 0, x_pixels-1,          /* Fill this whole page:              */
             y_pixels-1, clear_color);  /*   transparent (hi bit)  black (0)  */
} void swap_screens( void )               /* waits for a vertical retrace, and  */
;                                       /* then swaps FRONT_PAGE and BACK_PG  */
byte   write_list[4];                   /* 0-terminated list of altered regist*/ if( front_page==0 ) {
    front_page = 1;                     /* We'll display HI memory            */
    regs.vPan = 12;                     /*       display HI memory            */
    regs.page = 0;                      /* do writing into lo memory          */
  }
  else {
    front_page = 0;                     /* We'll display LO memory            */
    regs.vPan = 268;                    /*       display LO memory            */
    regs.page = 1;                      /* do writing into hi memory          */
  } write_list[0] = VPAN;                 /* write out vertical pan register    */
  write_list[1] = PAGE;                 /* write out page register            */
  write_list[2] = 0;                    /* that's all to write                */

VWait();                              /* wait for a vertical retrace        */
  WriteSet( (TplusRegPtr) ®s, write_list );
}
```

Appendix - page 3

```
void graphics_on( void )
{
int dac5Data[1];
int targaVGAMode[2];

if( !GraphInit( (TplusRegPtr) ®s )) {
    printf("TARGA driver not available\n");
    clean_exit(1);
  } regs = NTSC_756x486;                    /* Set the MODE !!!                      */ regs.overlayVGASrc = 1;                 /* Targa+ operation, no VGA overlay      */
  targaVGAMode[0] = 1;                    /* 1,0 => TARGA+ only, no VGA            */
  targaVGAMode[1] = 0;
  SetVGAOrTargaMode( (TplusRegPtr) ®s, targaVGAMode );  /* does a WriteAll */ dac5Data[0] = 1;                        /* 1 -> disable overlay capture          */
  SetDac5Data( (TplusRegPtr) ®s, dac5Data );            /* does a WriteAll */
                                          /* NOTE: perm causes problems when ...*/
  regs.perm         = 3;                  /* 16 bit, hi-res operation(>512 wide)*/
                                          /* ...used in 512 normal mode (=1)       */
  regs.ocpe         = 0;                  /* set to 0 for hi-res operation         */
  regs.depth        = 2;                  /* bytes per pixel-- 16 bit mode         */
  regs.cm1          = 0;                  /* capture mode is 16 bit color          */
  regs.byCap        = 3;                  /* captures go to lo mem                 */
  regs.overlaySrc   = 0;                  /* alpha from lo-mem hi bit (bit 15)     */
  regs.overlayInv   = 0;                  /* use overlay in normal orientation     */
  regs.compareEnb   = 0;                  /* no VGA overlay                        */
  regs.hiResMask    = 1;                  /* hi res ON  (width > 512)              */
  regs.hiRes        = 1;                  /* hi res ON  (width > 512)              */
  regs.nint         = FALSE;              /* interlaced operation                  */
  regs.color2       = 0;                  /* Well, the manual recommends it        */
  regs.color3       = 0;
  regs.maskLH       = 0;                  /* enable writing to all bits            */
  regs.top[0]       = 511;                /* allow top    of memory to show        */
  regs.top[1]       = 511;                /* allow top    of memory to show        */
  regs.bot[0]       = 0;                  /* allow bottom of memory to show        */
  regs.bot[1]       = 0;                  /* allow bottom of memory to show        */

/*** Now set up values to display live video *********************************/
  regs.rgb          = 0;                  /* RGB and sVideo both 0 = composite     */
  regs.sVideo       = 0;                  /* normally 0, 1 for S VHS               */
  regs.genlock      = 1;                  /* sync comes from live video            */
  regs.live8        = 0;                  /* use 24-bit live video data            */
  regs.fgp          = 0;                  /* no pre-processing                     */
  regs.livePortSrc  = 0;                  /* send live video data to "livePort"    */
  regs.livePortColor= 0;                  /* no live/border mixing stuff           */
  regs.livePortInv  = 0;                  /* do not invert the data                */
  regs.dispMode     = 2;                  /* OVERLAY MODE live vid, live border    */
  regs.lutBypass    = 1;                  /* bypass the LUTs                       */
  regs.liveMixBypass= 0;                  /* use the blender                       */

/*** Route the data to the mixer & overlay ***********************************/
  regs.bufferPortSrc= 1;                  /* lo mem -> Blender Buffer Port input*/
  regs.bufferPortColor=0;                 /* data from mem, not color registers    */
  regs.liveMixSrc   = 0;                  /* bi-level blending                     */
  regs.mixLock      = 0;                  /* allow blending  (Targa PLUS only)     */
  regs.OVLLevel     = 0xff;               /* use 100% live vid when OVL sig = T    */
  regs.notOVLLevel  = 0;                  /* use 100% ram data when OVL sig = F    */
```

Appendix - page 4

PATENT
4946-A-1

```
  regs.page        = 1;              /* do writing into hi memory       */
  front_page       = 0;              /* we're displaying LO memory      */

WriteAll( (TplusRegPtr) ®s );

y_pixels  = regs.height;           /* height of 1 display page        */
  x_pixels  = regs.width;            /* width  of 1 display page        */
  x_max     = regs.width -1;         /* used for looping in write functions*/
  buffer_wd= regs.width;

color_list[0] = (int) 0;                          /* opaque black     */
  color_list[1] = (int) (( 8<<10) + ( 8<<5) +  8);
  color_list[2] = (int) ((16<<10) + (16<<5) + 16);
  color_list[3] = (int) ((24<<10) + (24<<5) + 24);
  color_list[4] = (int) ((31<<10) + (31<<5) + 31); /* full brightness, white */
  color_list[5] = (int) (clear_color);             /* transparent / background*/ clear_back_page();                 /* Wipe screen, transparent        */
  swap_screens();                    /* put cleared page on display     */
  clear_back_page();                 /* Wipe other screen               */
} void graphics_off( void )
{
  GraphEnd( (TplusRegPtr) ®s );
}

/******************** RENDERING MODULE ********************************/
int prep_write_buffer( void )                  /* TRUE=sucess, FALSE=failure */
{
  buffer_ht = nemo_pat.height;
  buffer_ct = buffer_ht * buffer_wd * PIXEL_DEPTH;
  buff_addr = (u_int *) malloc(buffer_ct);    /* malloc returns a pointer even*/
  if( buff_addr==NULL ) {                     /*   for a zero-length item.    */
    printf("\nERROR -- can't allocate memory for write buffers\n");
    free( buff_addr );
    return( FALSE );
  }
  return( TRUE );
} static void draw_font_char( int cell_left, byte char_numb )
{
int    y, y_st, y_end;
u_int  st_element, end_element, elem;
u_int  *st_dat;                    /* Address of data start for this char*/
byte   *end_dat;                   /* Address of data end   for this char*/
u_int  offset;                     /* Offset into the array              */
byte   *font_color;                /* far pointer into a huge array      */
byte   *left_edge;
int    *buffer_addr;
int    x_pix;

if( char_numb == (byte) ' ' ) {  /* quick exit for space char.         */
    return;
  }
```

Appendix - page 5

```
offset    =char_numb * nemo_pat.height;/* These are double-indexed arrays of */
st_dat    =nemo_pat.start_datum+offset;/*   val[char][height].  We're        */
end_dat   =nemo_pat.end_datum  +offset;/*   offsetting several elements in,  */
left_edge=nemo_pat.left_edge   +offset;/*   and getting the starting address.*/ y_st =(int)nemo_pat.first_line[char_numb];/*bottom line of char  0 <= st<=end*/
y_end=(int)nemo_pat.last_line[char_numb]; /* top    line of char st<= end<= ht*/ for( y=y_st; y<=y_end; y++ ) {            /* cycle through all lines         */
   st_element = *( st_dat + (long) y); /* get entry point into aray of colors*/
   end_element= (u_int) *(end_dat + (long) y);
   end_element += st_element;
   x_pix  = cell_left + (int) ( *(left_edge + (long)y) );
   buffer_addr = (int *) (buff_addr + (y * buffer_wd) + x_pix);
   font_color = (byte far *) &(nemo_pat.color[st_element]);
   for( elem=st_element; elem<=end_element; elem++ ) {
      *buffer_addr++ = color_list[*(font_color++)];
   }
}
} void print_center( int y, byte *str )
{
int   i, len;
int   str_width;                        /* width of this string segmnt*/
int   cell_left;                        /* X position to draw at      */
byte  letter;

len = strlen(str);                   /* MEASURING PASS *************/
   str_width = 0;                       /* Initially, width 0...       */
   for( i=0; i<len; i++ )               /* do all char's in string    */
      str_width += (int) nemo_pat.char_width[(int)str[i]] + nemo_pat.right_edge;
   cell_left = x_pixels/2 - (str_width/2) + nemo_pat.right_edge;
                                        /* WRITING PASS ***************/
   SetUpBlock( 0, y, x_max, (y+BUF_Y_SIZE-1));  /* Area to draw text line in. */
   ReadBuff( (char *) buff_addr, buffer_ct );   /* Suck in the data there.   */
   for( i=0; i<len; i++ ) {
      letter = str[i];
      draw_font_char( cell_left, letter );
      cell_left += (int) nemo_pat.char_width[letter] + nemo_pat.right_edge;
   }
   SetUpBlock( 0, y, x_max, (y + BUF_Y_SIZE-1) );
   WriteBuff( (char *) buff_addr, buffer_ct );
}

/********************* SUBTITLE PREPARATION ***********************************/
void prepare_a_line( char *in_str )      /* Adds new lines to the output buffer*/
{
   strcpy( stitle_buffer[stitle_num_lines], in_str );
   stitle_num_lines++;
} void write_prepared_lines( void )       /* Works on the buffers filled above. */
{                                       /* It used the newline numb. to calc*/
int i, y_height;                        /* screen height. Text is displayed*/
                                        /* after next call to swap_screen() */
   y_height = BOTTOM_EDGE               /* Move 1 line up for every line      */
   +((nemo_pat.height+nemo_pat.bottom_edge) /* that we need to print.        */
```

Appendix - page 6

```
                           * stitle_num_lines );

for( i=0; i<stitle_num_lines; i++ ) { /* Put lines on-screen (back page)  */
    print_center( y_height, stitle_buffer[i] );
    y_height -= nemo_pat.height + nemo_pat.bottom_edge;
  } stitle_num_lines = 0;                 /* Done, reset to 0 lines stored   */
  for( i=0; i<MAX_OUT_BUF; i++ ) {      /*   wipe the line buffers clean   */
    stitle_buffer[i][0] = '\0';
  }
}

/************************ READ THE TIMES ************************************/
double time_value( char *line )         /* returns time in seconds          */
{                                       /* extracts time from a string      */
  double hours, mins, secs, frames;     /*   format:  h:mm:ss:fi            */ sscanf(line,"%lf:%lf:%lf:%lf", &hours, &mins, &secs, &frames );
  secs += hours  * 3600.0;
  secs += mins   *   60.0;
  secs += frames /   30.0;
  return( secs );
} void set_start_end_time( char *line )   /* This sets two global vars:       */
{                                       /*   start_time & end_time          */
  start_time = time_value( line );
  end_time   = time_value( strchr(line,',')+1 );
}
```

Appendix - page 7

```
PATENT
4946-A-1

/********************** MAIN PROGRAM ********************************/
void main( int argc, char *argv[] )
{
char    next_line[255];
double  off_time = 0.0;                 /* time to take text off screen  */
char    *input_filename;                /* source file, not to be altered */
char    *newline;                       /* remove the linefeed character */ if( argc<2 ) {
    printf("Usage: %s script_file\n\n",argv[0]);
    printf("Program copyright 1990-1993 by Jay Parks\n");
    printf("All rights reserved.\n");
    clean_exit( 1 );
  } input_filename = argv[1];
  in_file = fopen( input_filename,"rt");  /* Open the script file       */
  if( in_file==NULL ) {
    printf("%s: can't open script file '%s'\n", argv[0], input_filename );
    clean_exit( 1 );
  } open_mqx();                           /* Initialize the SMPTE reader  */
  graphics_on();                        /* Initialize the video display */
  if( !prep_write_buffer() )            /* Initialize output memory     */
    clean_exit( 1 );
                                        /*** MAIN LOOP *****************/
  while( !feof(in_file) ) {             /* Run for entire length of file */
    fgets( next_line, 254, in_file );   /* read the next line from the file */
    newline = strchr(next_line,'\n');   /* fine the newline character   */
    if( newline )
      newline[0]   = '\0';              /* the input line has no LFs    */
    next_line[79] = '\0';               /* the input is limited to 80 chars */
    if( next_line[0]=='@' ) {           /* Time code (and end of text)! */
      clear_back_page();                /* STEP 1: Print the existing lines */
      wait_until( off_time );           /*    wait for the proper moment... */
      swap_screens();                   /*    put up a blank page       */
      clear_back_page();                /*    clean the slate           */
      write_prepared_lines();           /*    write text on the "slate" */
      wait_until( start_time );         /*    wait for the proper moment... */
      swap_screens();                   /*    put up the text           */
      off_time = end_time;              /*    set time for this text to end */
      set_start_end_time( next_line+1 );/* STEP 2: Read the next time   */
    }
    else {                              /* Line DIDN'T start with @, so... */
      prepare_a_line( next_line );      /*    read the subtitling text  */
    }
  }
  clean_exit( 0 );                      /* Needed for warning-free compile */
}
```

Appendix - page 8

I claim:

1. A method for editing, in real time and in a single pass, a program stored on a video tape, said method comprising the steps of:

(a) storing a script in a computer, said script including at least one edit event represented by a key symbol followed by timing data and textual rendering instructions following said timing data;

(b) scanning said script until said key symbol is found and then
   (i) storing said timing data; and
   (ii) storing said textual rendering instructions in a text buffer;

(c) playing said video tape continuously through said program without pause to produce
   (i) a first video signal; and
   (ii) a SMPTE timing signal indicating elapsed time;

(d) comparing said elapsed time with said stored timing data until the elapsed time matches said stored timing data;

(e) converting said textual rendering instructions into a second video signal; and (f) combining said first video signal with said second video signal.

2. The method as set forth in claim 1 wherein said converting step comprises the steps of:

converting said textual rendering instructions from said text buffer into pixels and storing said pixels in a back page buffer while said comparing step takes place; and swapping said back page buffer with a front page buffer when the elapsed time matches said stored timing data.

3. The method as set forth in claim 2 wherein said converting step includes the step of converting said textual rendering instructions from character codes into graphic symbols.

4. The method as set forth in claim 1 wherein said script includes a plurality of edit events.

5. The method as set forth in claim 4 wherein the last of said edit events takes place after the end of said program.

6. A method for modifying, in real time and in a single pass, a sequence of images stored on video tape, said method comprising the steps of:

playing said video tape continuously throughout said sequence of images and without pauses to produce
   (i) a video signal representing said sequence of images and
   (ii) a SMPTE timing signal;

coupling said video signal to a graphics card in a computer;

storing a script relating to said sequence of images as a text file in said computer, said script defining a series of edit events wherein each edit event includes timing data and editing instructions to be executed at a particular time during the playing of said video tape;

monitoring said timing signal and interpreting said script with said computer to cause said computer to operate said graphics card in accordance with said edit events to produce a modified video signal; and recording said modified video signal.

7. The method as set forth in claim 6 wherein said interpreting step comprises the steps of:

reading a line from said script;

looking for a key symbol and, if the key symbol is not present, then storing said line in a temporary buffer as text, else storing said line in a buffer as a time code having on and off times.

8. The method as set forth in claim 6 wherein said graphics card includes a first image buffer, a second image buffer, and a buffer selector for selecting one of said first and second image buffers for modifying said video signal, and wherein said interpreting step comprises the steps of:

reading a line from said script;

looking for a key symbol; and if the key symbol is not present,
   then storing said line as text in a temporary text buffer, else
   clearing said second image buffer;
   swapping said second image buffer with said first image buffer;
   using the lines of script from said temporary text buffer to render pixels in said first image buffer;
   swapping said second image buffer with said first image buffer; and
   storing said line as a time code having on and off times.

9. The method as set forth in claim 8 wherein said first image buffer and said second image buffer are swapped during the vertical retrace of said video signal.

10. The method as set forth in claim 6 wherein said interpreting step is preceded by the steps of:

storing default values for said timing data.

11. The method as set forth in claim 10 wherein said interpreting step is repeated for each edit event and said default values are used while interpreting the first of said series of edit events.

12. A method for editing, in real time and in a single pass, a program stored on a video tape, said method comprising the steps of:

producing a copy of said tape, said copy displaying SMPTE timing information, producing a script from said tape, said script defining a series of edit events, with each edit event in the form of a key symbol followed by timing data, followed by textual rendering instructions;

storing said script in a predetermined format in a computer;

playing said video tape continuously throughout said program and without pauses to produce
   (i) a video signal representing said program and
   (ii) a SMPTE timing signal;

coupling said video signal to a graphics card in said computer;

monitoring said timing signal with said computer and executing said script as a high level language program to cause said computer to operate said graphics card in accordance with said edit events to produce a modified video signal; and recording said modified video signal.

* * * * *